(12) United States Patent
Fischer

(10) Patent No.: US 7,583,934 B2
(45) Date of Patent: Sep. 1, 2009

(54) TRANSCEIVER APPARATUS FOR USE IN A MULTI-FREQUENCY COMMUNICATION SYSTEM, BASE STATION OF A MULTI-FREQUENCY COMMUNICATION SYSTEM, METHOD FOR USE OF THE TRANSCEIVER APPARATUS, METHOD OF TRANSCEIVING A MULTI-FREQUENCY SIGNAL IN A MULTI-FREQUENCY COMMUNICATION SYSTEM

(75) Inventor: Harald Fischer, Bad Ems (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/525,485

(22) PCT Filed: Aug. 13, 2003

(86) PCT No.: PCT/IB03/03722

§ 371 (c)(1),
(2), (4) Date: May 3, 2006

(87) PCT Pub. No.: WO2004/021593

PCT Pub. Date: Mar. 11, 2004

(65) Prior Publication Data

US 2006/0240785 A1    Oct. 26, 2006

(30) Foreign Application Priority Data

Aug. 29, 2002    (EP) .................................. 02102240

(51) Int. Cl.
*H04B 1/38* (2006.01)

(52) U.S. Cl. ..................... 455/73; 455/78; 455/101; 455/552.1

(58) Field of Classification Search .................... 455/73, 455/78, 101, 552.1, 562.1
See application file for complete search history.

(56) References Cited

U.S. PATENT DOCUMENTS 5,579,341 A    11/1996    Smith et al.

(Continued)

FOREIGN PATENT DOCUMENTS

EP    0 800 283    * 10/1997

(Continued)

*Primary Examiner*—Nay A Maung
*Assistant Examiner*—Tuan H Nguyen
(74) *Attorney, Agent, or Firm*—E. Russell Tarleton; Seed IP Law Group PLLC

(57) ABSTRACT

In a transceiver apparatus for use in a multi-frequency communication system a multi-frequency antenna terminal operation allows antenna transmission and reception-modes to be combined. A frequency conversion circuitry has a transmission path and a reception path, wherein each of these paths communicatively connects a signal processor and an antennaswitch. The antenna-switch comprises a multi switch, a transmission-multiplexer and a reception-multiplexer, wherein the antenna switch may be controlled by the signal processor and the multiplexers may be controlled by the signal generator via the multi switch. The antenna has a transmission connector for connecting the transmission path to the antenna and a reception connector for connecting the reception path to the antenna. Advantageous configurations of the transceiver provide an S-loop antenna design and phase matching units in an antenna terminal and a Butler-matrix of the antenna-switch. This provides an antenna and an antenna-switch with an optimal matching factor and consequently improves multi-frequency transceiver operation.

24 Claims, 12 Drawing Sheets

U.S. PATENT DOCUMENTS

| | | | |
|---|---|---|---|
| 5,809,405 A * | 9/1998 | Yamaura | 455/101 |
| 5,910,948 A | 6/1999 | Shou et al. | |
| 5,991,643 A | 11/1999 | Chao-Cheng | |
| 6,034,640 A | 3/2000 | Oida et al. | |
| 6,038,250 A | 3/2000 | Shou et al. | |
| 6,104,935 A | 8/2000 | Smith et al. | |
| 6,128,486 A * | 10/2000 | Keskitalo et al. | 455/422.1 |
| 6,185,244 B1 | 2/2001 | Nystrom et al. | |
| 6,188,682 B1 | 2/2001 | Takagi et al. | |
| 6,198,443 B1 | 3/2001 | Powles et al. | |
| 6,210,001 B1 | 4/2001 | Huang | |
| 6,225,951 B1 | 5/2001 | Holshouser et al. | |
| 6,225,958 B1 | 5/2001 | Amano et al. | |
| 6,243,565 B1 * | 6/2001 | Smith et al. | 455/101 |
| 6,285,874 B1 | 9/2001 | Magnusson et al. | |
| 6,310,856 B1 | 10/2001 | Taipale | |
| 6,844,862 B1 * | 1/2005 | Cencich et al. | 343/832 |
| 7,260,424 B2 * | 8/2007 | Schmidt | 455/575.7 |
| 2003/0017809 A1 * | 1/2003 | Garlepp et al. | 455/87 |

FOREIGN PATENT DOCUMENTS

| | | |
|---|---|---|
| EP | 1073208 A2 | 1/2001 |
| EP | 1126630 A2 | 8/2001 |
| EP | 1330080 A2 | 7/2003 |
| WO | 98/24195 A1 | 6/1998 |
| WO | 00/65735 A1 | 11/2000 |

* cited by examiner

TRANSCEIVER APPARATUS FOR USE IN A MULTI-FREQUENCY COMMUNICATION SYSTEM, BASE STATION OF A MULTI-FREQUENCY COMMUNICATION SYSTEM, METHOD FOR USE OF THE TRANSCEIVER APPARATUS, METHOD OF TRANSCEIVING A MULTI-FREQUENCY SIGNAL IN A MULTI-FREQUENCY COMMUNICATION SYSTEM

The invention relates to a transceiver apparatus for use in a multi-frequency communication system, comprising a signal processor, a frequency conversion circuitry, an antenna-switch and an antenna terminal having at least one antenna. Further, the invention relates to a base station of a multi-frequency communication system comprising the transceiver apparatus. The invention also relates to a method of use of the transceiver apparatus and a method of transceiving a multi-frequency signal in a multi-frequency communication system, comprising the steps of processing the signal in a signal processor, frequency converting the signal in a frequency conversion circuitry, operating an antenna terminal by an antenna-switch and transceiving the signal by means of at least one antenna of the antenna terminal.

Multi-frequency communication systems are currently in widespread use either for providing telecommunications, to mobile users in particular, or for contemporary or future applications of Personal Computer Networks (PCN), Digital Communication Systems (DCS) or Global Systems of Mobile Communication (GSM). Multi-frequency communication systems are particularly prevalent in cellular radio frequency (RF) systems for users of various mobile telephone standards or cellular systems, such as digital Time Division Multiple Access (TDMA), Frequency Division Multiple Access (FDMA), or Code Division Multiple Access (CDMA). The varied system standards are referred to hereinafter as modes.

The referenced systems usually operate either on a single frequency band or multiple frequency bands. The latter are referred to hereinafter as multi-frequency communication systems. The frequencies are usually radio frequencies, the most prevalent being the 900 MHz, 1800 MHz or 1900 MHz bands. A limited number of carrier frequencies are available for each band, wherein each carrier frequency usually supplies a band of 30 KHz in width for signal transmission. As these carrier frequencies are a limited resource in the frequency spectrum, this imposes basic limits on the maximum user capacity of any transceiver apparatus or base station in a multi-frequency communication system. Generally directional antennas are used which produce directional radiation beams that allow a single carrier frequency to be reused for a number of users. In comparison with omni-directional antennas or conventional sectorial antennas, such a measure increases the system capacity. Further, in most of the referenced systems a cell search is necessary to track a mobile user who is literally mobile.

The above listed systems generally comprise a signal processor, which is used for processing a modulated signal in a transmitter and/or receiver section and also for digital and/or analog signal conversion. The analog signal therein is supplied to a frequency conversion circuitry in order to frequency-convert the signal and modulate or demodulate the signal with regard to a radio frequency. The radio frequency is used as a carrier frequency for signal transmission and/or receipt. Such a signal is usually supplied to a switching device, hereinafter referred to as an antenna switch, in order to switch the multi-frequency signal destination. This is particularly true for multiplex signals. Thus, the purpose of operating an antenna terminal is to transceive the signal by means of at least one antenna of the antenna terminal.

Each of the devices, i.e. a signal processor, a frequency conversion circuitry, an antenna-switch or an antenna terminal, has to be adapted and tuned to the others in such a way, that they coordinate smoothly and allow the transceiver apparatus to operate correctly with regard to a specific frequency, a transmission-mode or a reception-mode and/or mode regarding a certain system standard.

The principle operation of a transceiver apparatus is disclosed in U.S. Pat. No. 5,579,341 for instance. A multi-channel digital transceiver for receiving up-link radio frequency signals and converting these signals to digital intermediate frequency signals is included therein. Digital signal processing, by means of a digital converter module, is applied and intermediate frequency signals received by a plurality of antennas are converted to base band signals. The base band signals are in turn processed in order to recover a communication channel. Down-link base band signals are also processed and the integrated digital signal processing in the digital converter module up-converts and modulates the down link base band signals into digital intermediate frequency signals. The digital intermediate frequency signals are converted into analog radio frequency signals, amplified and radiated from transmit antennas. However, such modules use separate antennas and transceivers for a transmission-mode and a reception-mode respectively. This has certain drawbacks with regard to a multi-channel communication system. Unlike traditional communication units, which are designed to operate under a single information signal coding and channelization standard only, the multi-channel communication unit disclosed in U.S. Pat. No. 5,579,341 already includes a digital signal processing portion which, at least in principle, may operate in accordance with any one of the numerous information signal coding and channelization standards. Nevertheless, its antenna design contains significant drawbacks. In particular, a multi-frequency operation is not possible in an advantageous way. The teachings of U.S. Pat. No. 5,579,341 are directed towards a wide band but single frequency operation.

Certain drawbacks are also inherent in a switching device used in a transceiver as disclosed in EP 1 073 208 A2, wherein a high frequency switching component with two states is disclosed. In the first state a reception circuit is connected to the antenna terminal and in the second state the transmission circuit is connected to the antenna terminal. Here a separate mode of transmission and reception forms an inherent part of the operation, i.e. a combined transmission and reception operation is not possible.

Further systems are already suitable for multi-frequency operations, however these contain additional drawbacks. In EP 1 330 080 a multi-frequency radio communication device and a method of controlling antenna timing provides an antenna-switch for temporal sequential switching of antennas according to a predetermined pattern. Such predetermined patterns make the disclosed system rather inflexible and restrict the system to a TDMA mode. Similarly, a system disclosed in WO 98/24195 is suitable for multi-frequency application, but is however, restricted to a base station operation in TDMA mobile communication mode. Consequently, the layout of such systems may be rather simple, but the systems are inflexible as regards both design and operation.

In most switching devices for multiplexing, a Butler-matrix such as the one disclosed in U.S. Pat. No. 6,104,935 is used to advantage. The down-link beam-forming architecture for heavily overlapped beam configuration disclosed therein, however, is specifically adapted for TDMA mode applications, i.e. different modes may not be combined. Further, the Butler-matrix disclosed therein may be improved with regard to certain items as far as a multi-mode and/or multi-frequency operation is concerned.

As regards the antenna terminal and the antennas of such antenna terminals, an antenna is usually adapted for single frequency operation in prior art. For instance, the antenna disclosed in U.S. Pat. No. 6,034,640 is restricted to a single frequency range at 900 MHz. Although the antenna is adapted by a frequency adjusting circuit for the adjustment of the resonant antenna frequency in such a frequency range, a multi-frequency antenna application, i.e. an application for several frequency bands, is not feasible.

Various kinds of multi-frequency antennas are disclosed in U.S. Pat. No. 6,225,958 B1, U.S. Pat. No. 6,225,951 B1 and U.S. Pat. No. 6,198,443 B1. A separate slot antenna is disclosed in U.S. Pat. No. 6,210,001 B1. However, what is neither disclosed nor apparent is, if and how these antennas may be used in a transceiver apparatus in a multi-frequency communication system.

Other transceivers such as the one disclosed in U.S. Pat. No. 5,809,405 either use a number of duplexers for switching an antenna or several switches for switching an antenna, like in U.S. Pat. No. 5,991,643, or a simple cross-switch such as the one in WO 98/24195.

As regards cell search strategies, a proper strategy is provided in EP 1 126 630 A2. Other search characteristics such as the one disclosed in U.S. Pat. No. 6,188,682 B1, are directed towards a CDMA mode for improving such searches by multiplexing two kinds of signals. With regard to CDMA search schemes, further disclosures are made in U.S. Pat. No. 6,185,244 B1, U.S. Pat. No. 6,038,250 B1, U.S. Pat. No. 5,910,948, U.S. Pat. No. 6,285,874 B1, U.S. Pat. No. 6,310,856 B1 and WO 00/65735, which are, however, cited only for purposes of background information only.

As outlined above, none of the systems is able to provide a proper transceiver apparatus made of flexible design, which may be used in a multi-frequency communication system. In particular, neither multi-mode nor combined operations are possible in such prior art systems.

This is where the invention comes in, the object of which is to provide an apparatus for use in a multi-frequency communication system, a method of use of such an apparatus and a method of transceiving a multi-frequency signal in a multi-frequency communication system of flexible design and operation.

As regards the apparatus, the object is achieved by the transceiver apparatus referenced in the introduction, wherein in accordance with the invention the frequency conversion circuitry has a transmission path and a reception path, wherein each of the paths communicatively connects the signal processor and the antenna-switch, the antenna-switch comprises a multi-switch, a transmission-multiplexer and a reception-multiplexer, wherein the multiplexers are controllable by the signal processor via the multi-switch, the antenna has a transmission-connector for connecting the transmission-path to the antenna and a reception-connector for connecting the reception-path to the antenna, wherein the antenna-switch, controllable by the signal processor, allows multi-frequency operation of the antenna by combining a transmission-mode and a reception-mode of the antenna.

The main concept of the invention is to advantageously combine an antenna transmission-mode and a reception-mode in the transceiver apparatus. Consequently, the proposed frequency conversion circuitry has a combined transmission and reception path. The antenna-switch also supports this concept by providing a transmission-multiplexer and a reception-multiplexer. The antenna has an extremely advantageous transmission-connector for connecting the transmission path to the antenna and a reception connector for connecting the reception path to the antenna. This combination of transmission and reception-modes—which affects the layout of the frequency conversion circuitry as well as of the antenna-switch, the antenna terminal and the antenna—allows a particularly simple and flexible design of the transceiver apparatus and operation. This will be further outlined in the method claims.

As regards the method, the object is achieved by the method referenced in the introduction, wherein according to the invention frequency converting of the signal in the frequency conversion circuitry is established on a transmission path and a reception path, wherein each of the paths communicates the signal between the signal processor and the antenna-switch, multi-frequency antenna terminal operation is established by combining a transmission-mode of the antenna and a reception-mode of the antenna, controlled by the signal processor, by means of:

the antenna-switch, which comprises a multi-switch, a transmission-multiplexer and a reception-multiplexer, wherein the multiplexers are controlled by the signal processor via the multi-switch, and communicating the signal between the transmission-path and the antenna via the transmission-multiplexer and a transmission-connector of the antenna, and between the reception-path and the antenna via the reception-multiplexer and a reception connector of the antenna.

It has been realized by the invention, that such a system, wherein all necessary components are adapted to each other with respect to the combination of transmission and reception-modes allows the processing of multi-frequency communication with high quality and minimal losses. Further, the system costs of the transceiver apparatus and operation thereof are extremely low.

As will be outlined in the method of use claims, such transceiver apparatus can be used advantageously in a number of multi-mode or combined systems, i.e. in a number of systems having different standards, for instance to allow a cellular wireless communication and/or usage within personal communication systems.

Particularly advantageous use that an antenna of the proposed transceiver may be used for both a transmission-mode and a reception-mode. This depends on the situation. Further, the antenna is switched in an advantageous and easy way.

As regards the method of use, the object is achieved according to the invention by a method of use of the transceiver apparatus in a multi-frequency communication system such as a mobile cellular communication system or personal communication system. In particular, a mobile cellular communication system may include CDMA, a FDMA or a TDMA modes or systems. A combined or multi-mode communication system may also be selected, such as a CDMA-FDMA/TDMA and/or a FDMA-TDMA system, in particular a 2.5 G system.

A PCS/N, 3G mode and/or GSM system may be specifically selected. A as regards a personal communication system, in particular a mode of a PCS/N, 3G and/or GSM system may be selected. Also a multi-mode or combined system of 3G/GSM is also advantageous.

In particular, a method of use of the transceiver apparatus in a mobile cellular communication system is advantageous in combination with a personal communication system.

These and other advantages of the invention are improved to an even greater extend by further developed configurations of the invention, which are outlined in more detail in the dependent claims.

In accordance with another advantageous aspect of the invention, the signal processor is an analog digital signal processor formed by a direct digital synthesizer (DDS) driven phase locked loop (PLL) radio frequency signal generator. Such a signal processor is particularly suitable for generating a modulated transmitter signal and a local oscillated receiver signal.

In accordance with yet another aspect of the invention, the frequency conversion circuitry advantageously comprises at least one local oscillator and a power divider to supply local oscillator power to the transmission and/or reception path. In one configuration thereof, the frequency conversion circuitry may comprise a mixer device for converting the signal between an intermediate frequency and a radio frequency. In another configuration thereof the frequency conversion circuitry may comprise a direct conversion device for converting the signal between a base band frequency and a radio frequency, in particular by means of an in-phase and quadrature (IQ) method.

In a receive mode, the direct digital synthesizer driven phase locked loop preferably has a narrow band filter to produce a better phase noise. In another configuration in a zero intermediate frequency (zero IF) the receiver demodulation may directly convert a radio frequency signal to a base band frequency. In a transmitter mode, the DDS modulates the signal and the PLL may operate in a broader bandwidth than a receive mode to achieve a better RF modulated signal. A transceiver comprising the described DDS with this aspect of the invention achieves an advantageously fast switch speed and may be manufactured at low costs.

To allow for a combined transmission and reception-mode, and in particular for a multi-mode or combined system, according to further aspects of the invention, a specific design of antenna-switch, antenna terminal and an antenna of the antenna terminal is provided.

In accordance with a further aspect of the invention, the antenna terminal preferably comprises a patching unit formed as a low-pass filter to improve the process of matching the antenna with different frequencies within the multi-frequency spectrum and/or different modes of a mobile cellular communication or personal communication system. The antenna terminal may, in particular, comprise a matching unit for the antenna. An LC-component would be the most advantageous, to provide an optimal matching factor for the antenna.

The antenna terminal advantageously comprises at least two, usually four antennas. This allows the flexible application of common main frequency bands. In particular, a first antenna may be provided for a frequency band range of 850-900 MHz, a second antenna for a frequency band range of 1800 MHz to 1900 MHz, a third antenna for a frequency band range of 2000 MHz to 2100 MHz and a fourth antenna for additional radio frequency inputs and may also be adapted for beaming. Preferably, all of these antennas should operate in receive mode. In particular, all, or at least one of the antennas, should also operate in transmission-mode, and preferably in parallel and/or combination mode. Thus, four corresponding switches may be used to switch the antennas and to ensure that the common main operates as flexibly as possible.

In accordance with a still further aspect of the invention, the antenna is formed as an s-loop antenna with two ends, the ends preferably being formed as the transmission connector for connecting the transmission path to the antenna and the reception connector for connecting the reception path to the antenna. This allows the transceiver to switch advantageously from one antenna to the other in an X-function manner. The process is best regulated by the signal processor which controls the multiplexers.

In one configuration the antenna is a copper-wired, flexible-line antenna made of copper. This is a particularly cost-effective method of manufacturing an antenna.

In another configuration the antenna may be an SMD-planar-antenna. This is a preferred antenna form and may also be selected depending on the application.

As regards the patching and/or matching unit, such units are preferably integrated as part of the antenna body.

The above outlined s-loop antenna configuration allows an advantageous beam design. In particular, the antenna terminal may form a 360 degree beam and the antenna beam is formed within a range of 200 degrees. The antenna beam advantageously comprises a 90 degree beam formed by a 50 degree main beam and two 20 degree side beams.

In accordance with a yet still further aspect of the invention, the antenna-switch comprises a matching unit formed as a frequency regulated matching filter to provide an optimal matching factor for the antenna. It may also be preferred that the antenna-switch comprise a bus connection to the signal processor, the said bus connection being advantageously formed as a matching network. A particularly preferred embodiment of the matching network is illustrated in FIG. 9 in the detailed description.

The switch outlined in this aspect of the invention allows an advantageous switching speed of more than 477 µs. This is a particular preference as, in a GSM-system, the speed of a switch should be faster than one cycle. The transceiver apparatus may also be applied as outlined above to a multi-mode system, i.e. several modes may be used in parallel operation. In particular, this means that the transceiver apparatus may be operated in a GSM-band, at 1900 MHz for instance, and also in parallel operation in a typical 3G-mode. Roaming may be permissible according to ETSI and 3G-group specifications.

The described patching and matching units allow all integrated antennas to be used advantageously for all system frequencies.

In accordance with yet still even further aspect of the invention, a particularly preferred beam forming matrix device is integrated into the antenna-switch. In particular, the antenna-switch further comprises a beam forming matrix device, formed as a Butler-output matrix. Such a matrix may be selected from the group consisting of: a 4×4, a 8×8 or a 16×16 Butler-output matrix.

An existing matching unit inside the Butler-matrix is also preferable. As a particularly preferred configuration thereof, a modified Butler-output matrix output/input is formed as a frequency-regulated matching filter. This also allows the advantageous provision of an optimal matching factor for the antenna.

In summary, it is proposed that in order to allow the multi-frequency operation of an antenna terminal, which combines antenna transmission and reception-modes, in a transceiver apparatus for use in a multi-frequency communication system, a frequency conversion circuitry should include both a transmission path and a reception path, wherein each of these paths communicatively connects the signal processor and the antenna-switch. The antenna-switch comprises a multi-switch, a transmission-multiplexer and a reception-multiplexer, wherein the said multiplexers may be controlled by the signal generator via the multi-switch. The antenna has a transmission connector for connecting the transmission path and a reception connector for connecting the reception path to the antenna. The antenna-switch is regulated by the signal processor. Advantageous configurations therefore provide an s-loop antenna design, and phase matching units in an antenna terminal and a Butler-matrix of the antenna-switch. This allows an optimal matching factor for each of the antennas and for matrix usage.

Whereas the invention is particular suitable for, and is described as being associated with specific multi-frequency communication systems, it should be understood that the transceiver apparatus and its method of operation may also be operated in association with other forms of multi-frequency communication systems not specifically mentioned. In particular, the preferred transceiver apparatus may not only be used in a mobile communication system, but the basic transceiver principle may also operate in a typical base station environment. The transceiver apparatus is also particularly suitable for use in multi-mode or combined multi-frequency communication systems, in particular in systems which allow CDMA-FDMA/TDMA and FDMA/TDMA (2.5 G) processing. This is particularly achieved by the specific beam design as outlined above with regard to one or more aspects of the invention. As regards combined operation, operation within a GSM/PCM/DCS system is achieved by combining the 850 MHz to 2100 MHz antenna terminals, as is also outlined with regard to one or more aspects of the invention. Such antenna terminals also provide the user with an increased propagation security.

To facilitate a more complete understanding of the invention, preferred embodiments of the invention will now be described in detail with reference to the accompanying drawings. The detailed description will illustrate and describe the considered preferred embodiment of the invention. It should, of course, be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention, may be essential for the invention, considered alone or in combination.

Figure 1:
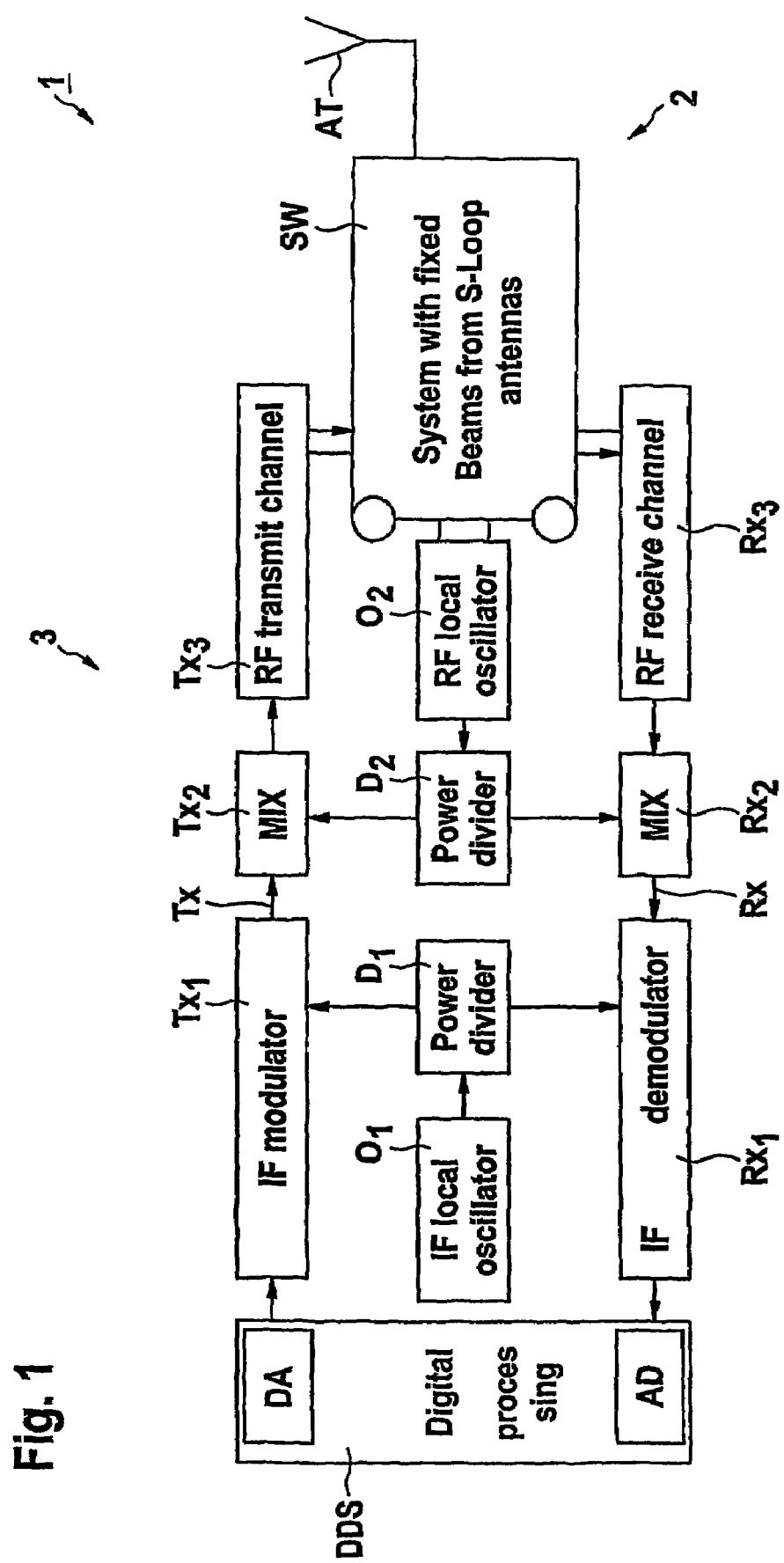
FIG. 1 is a diagram illustrating a basic construction of a first embodiment of a transceiver apparatus to allow combined transmission and reception-modes according to a preferred embodiment.

FIG. 1 illustrates a preferred transceiver apparatus 1 embodiment in a conceptual diagram. A signal is digitally processed in a signal processor DDS which is formed as a direct digital synthesizer driven phase locked loop (PLL) radio frequency (RF) signal generator. The processor DDS comprises a digital analog conversion unit DA for converting a digital signal into an analog signal. The signal processor DDS also comprises an analog-digital conversion unit AD for converting an analog signal into a digital signal. Further, the transceiver apparatus 1 comprises a frequency conversion circuitry 3, wherein a transmission-path Tx is formed by an intermediate frequency modulator $Tx_1$, a mixing device $Tx_2$ and a radio frequency transmit channel $Tx_3$. Further, a reception-path of the frequency conversion circuitry 3 is formed by an intermediate frequency demodulator $Rx_1$, a mixing device $Rx_2$ and a radio frequency receive channel $Rx_3$. Using the transmission-path, the modulated signal is modulated in an intermediate frequency (IF) range by the intermediate frequency modulator $Tx_1$ and is converted to radio frequency (RF) by means of the mixing device $Tx_2$. A radio frequency signal is supplied to the antenna system 2 by means of a radio frequency transmit channel $Tx_3$. The transmit channel $Tx_3$ comprises suitably adapted components such as a filter, an amplifier and a switch.

Parallel to signal processing on the transmission-path Tx a received radio frequency signal may also be processed via the reception-path Rx through the radio frequency receive channel $Rx_3$. A radio frequency receive channel $Rx_3$ may include suitably adapted components such as a filter and a low noise amplifier. The radio frequency signal is further down-converted into an intermediate frequency signal by means of a mixing device $Rx_2$. Additional components such as a filter or an auto gain controller may also be provided. The received signal is further processed in the reception-path Rx via an intermediate frequency demodulator $Rx_1$ and supplied to the signal processor DDS, and in particular to the analog digital unit AD. For frequency conversion in a mixing device $Rx_2$ and/or $Tx_2$ in the preferred embodiment of FIG. 1 two local oscillators $O_1$, $O_2$ are used. A first local oscillator $O_1$ is provided in the intermediate frequency range and a second local oscillator $O_2$ is provided in the radio frequency range. The local oscillators $O_1$, $O_2$ signal power is divided by the respective power divider means $D_1$, $D_2$. The divided power of the intermediate frequency local oscillator $O_1$ is supplied, depending on the situation, to either the intermediate frequency modulator $Tx_1$ of the transmission-path Tx or the intermediate frequency demodulator $Rx_1$ of the reception-path Rx. The divided power of the radio frequency local oscillator $O_2$ is supplied, depending on the situation, to either the transmission-path mixing device $Tx_2$ or the reception-path mixing device $Rx_2$. The radio frequency local oscillator is also adapted to supply power to the antenna-switch SW. In this preferred embodiment a local oscillator is implemented using a phase locked loop (PLL), thereby providing a good frequency stability while still maintaining a sufficient switching speed.

In the preferred embodiment of FIG. 1 an antenna system 2 comprises an implemented antenna-switch (SW) and an antenna terminal (AT) with at least one antenna (A).

The typical four s-loop antennas are preferably built in a housing as a copper wired system. An SMD-planar system may also be used as an alternative or in combination, if so preferred. The copper wired solution should, however, be more cost effective.

As will be described in more detail throughout the system, a matching unit is provided properly in respective components in order to make proper and efficient use of all integrated antennas for all frequencies. In particular, a matching unit is built into each of the antennas. A patching unit is also built as a low-pass filter to use all integrated antennas of the antenna system for all frequencies. The wires of the antennas are used particularly as antennas with a transmissionpath Tx connector on one side and a receptionpath Rx connector on the other side. The system is preferably switched from one antenna to the other in an X-function regulated manner by the signal processor DDS. Details will be provided with particular regard to FIG. 3.

As will be described in more detail with regard to FIGS. 7, 8 and 9, an antenna-switch SW, SW' comprises several multiplexer switches, at least one transmission-multiplexer TxMUX and a reception-multiplexer RxMUX, wherein each of the multiplexer switches are controlled by the signal processor. This allows the transceiver apparatus of this preferred embodiment to operate at a particular high switching speed, i.e. faster than a contemporary cycle time of 477 µs. It is also possible for a transceiver apparatus of this preferred embodiment to be used in a multi-mode system, i.e. the transceiver apparatus of the preferred embodiment may be operated in a GSM-band such as 1900 MHz and also in parallel operation with a typical 3G-mode. Roaming is also permissible with this transceiver apparatus according to ETSI and 3G-group specifications.

Figure 2:
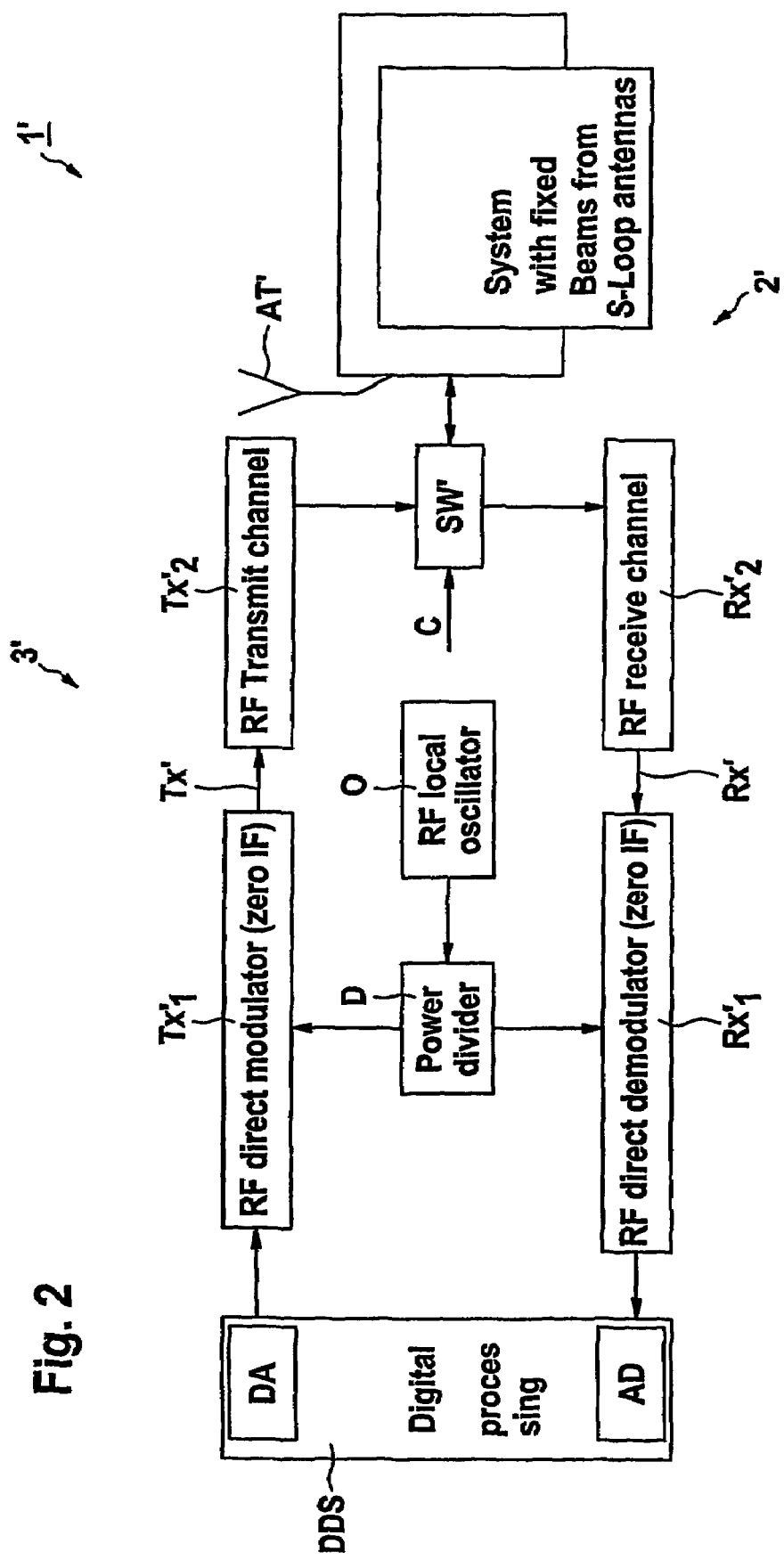
FIG. 2 is a diagram illustrating a basic construction of a second embodiment of a transceiver apparatus to allow combined transmission and reception-modes.

In FIG. 2 a second preferred transceiver apparatus embodiment 1' is illustrated in a schematic view. Whereas the functional principle is more or less the same as in the embodiment 1 described with respect to FIG. 1, the preferred embodiment 1' of FIG. 2 is construed as a direct conversion system in TDD-mode. In a frequency conversion circuitry 3', the modulated signal of a signal processor DDS is modulated directly into a radio frequency range using a radio frequency direct modulator $Tx_1'$ in a transmission path Tx'. The signal is further processed in a radio frequency transmission channel $Tx_2'$ and supplied to an antenna-switch SW'. Further, in a reception path Rx' a radio frequency receive channel $Rx_2'$ receives a modulated signal via the antenna-switch SW' and supplies the modulated signal to a radio frequency direct demodulator $Rx_1'$, which demodulates the radio frequency signal directly to base band, i.e. zero intermediate frequency (zero IF). The direct modulation by means of the direct modulator $Tx_1'$ and demodulation by means of the direct demodulator $Rx_1'$ is performed by using the in-phase quadrature (IQ) method wherein in-phase components (I) and quadrature components (Q) are provided. In this particular preferred embodiment one local oscillator O is sufficient for implementation via a PLL. The power of the local oscillator O is supplied to either the direct modulator $Tx_1'$ or the direct demodulator $Rx_1'$ by means of a divider D.

In this particular preferred embodiment 1' an external antenna-switch SW' is used to communicate a signal either to or from an antenna system 2' comprising an antenna terminal AT' with at least one antenna A. The antenna systemand, in particular, the antennas A of the antenna terminal AT' may be manufactured in the same way as described with regard to the preferred embodiment of FIG. 1.

Figure 3:
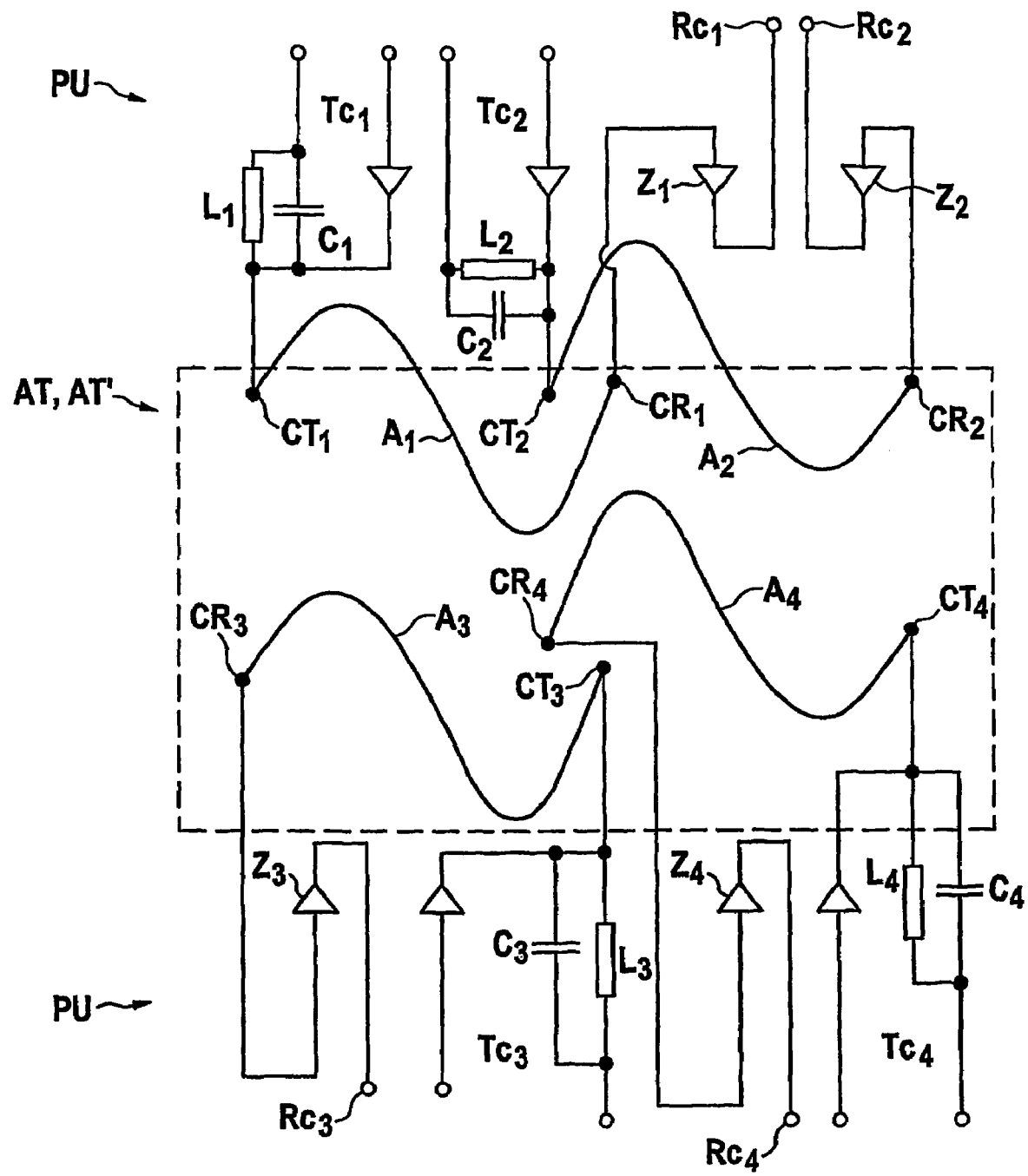
FIG. 3 is a wiring diagram illustrating the basic principle of an antenna terminal comprising four s-loop antennas, which may be operated in a switched or coupled multi-frequency mode.

FIG. 3 illustrates the basic principles of an antenna system 2, 2' comprising an antenna terminal AT, AT' of four antennas $A_1, A_2, A_3$ and $A_4$. Each of the antennas $A_1 \ldots A_4$ is connected on one side via a patching network to the transmission path Tx and on the other side via a patching network to the reception path Rx. The respective connections are referred to as channels. For instance, the antenna $A_1$ has a transmission connector $CT_1$ connecting the transmission channel $Tc_1$ via a patching network with an LC-unit $L_1$, $C_1$, built as a low pass filter to use the antenna $A_1$ for all frequencies to the transmission path Tx. Further, the antenna $A_1$ comprises a reception connector $CR_1$ for connecting the reception channel $Rc_1$ to the reception-path Rx. Further, the connection is made by means of a switch $Z_1$. The switch $Z_1$ is in the OFF position if the transmission-channel $Tc_1$ is used for the antenna $A_1$. The switch $Z_1$ is in the ON position if the reception-channel $Rc_1$ of the antenna $A_1$ is used. Antenna $A_1$ is specifically adapted to operation in a frequency range of 850 to 900 MHz. Accordingly, the further components, i.e. the patching network $L_1$, $C_1$ and the switch $Z_1$ and other components are also adapted with regard to the particular frequency range of 850 MHz to 900 MHz.

Basically, the other antennas $A_2, A_3$ and $A_4$ are connected in the same way to a reception-path Rx via a reception-channel $Rc_2$, $Rc_3$ and $Rc_4$ and to a transmission path Tx via a transmission channel $Tc_2$, $Tc_3$, $Tc_4$, respectively. Accordingly, each of the antennas $A_2, A_3$ and $A_4$ include respective transmission connectors $CT_2$, $CT_3$ and $CT_4$ and reception connectors $CR_2$, $CR_3$ and $CR_4$. The switches $Z_2$, $Z_3$ and $Z_4$ respectively are also basically allocated in a analogue manner as described with regard to antenna $A_1$. The same holds true of the patching networks $L_2$, $C_2$ and $L_3$, $C_3$ and $L_4$, $C_4$ respectively. However, the difference is that the connections, the patching network and the respective antenna channels are adapted for different frequency ranges. As outlined above, the antenna $A_1$, its connectors and patching network are adapted to operate correctly within a frequency range of 850 MHz to 900 MHz. The corresponding layout of the antenna $A_2$ and its connectors and patching network and transmission/reception-channels are adapted to operate correctly within a frequency range of 1800 MHz to 1900 MHz. The antenna $A_3$ and its corresponding components are adapted to operate correctly within a frequency range of 2000 MHz to 2100 MHz. Of course, each of the antennas may also operate at frequencies exceeding the specified ranges, however, by tuning each of these antennas optimal performance is achieved within the specified frequency range for each antenna. A broad frequency range is particularly suitable for antenna number four $A_4$ and its connectors, patching network and reception/transmission-channels. The antenna $A_4$ and its components are adapted to operate at various different radio frequency inputs and provide a proper beaming tool.

As regards the material used for the antennas, each of them is formed as an s-loop as is essentially shown in FIG. 3. As outlined above, an antenna may be configured as a copper wire, with all antennas being housed in the antenna terminal, as indicated by the dashed line in FIG. 3. Alternatively, if preferred, each or a number of the four antennas may also be configured as an SMD-planar antenna implemented in an integrated antenna terminal, as indicated by the dashed line in FIG. 3.

Figure 4:
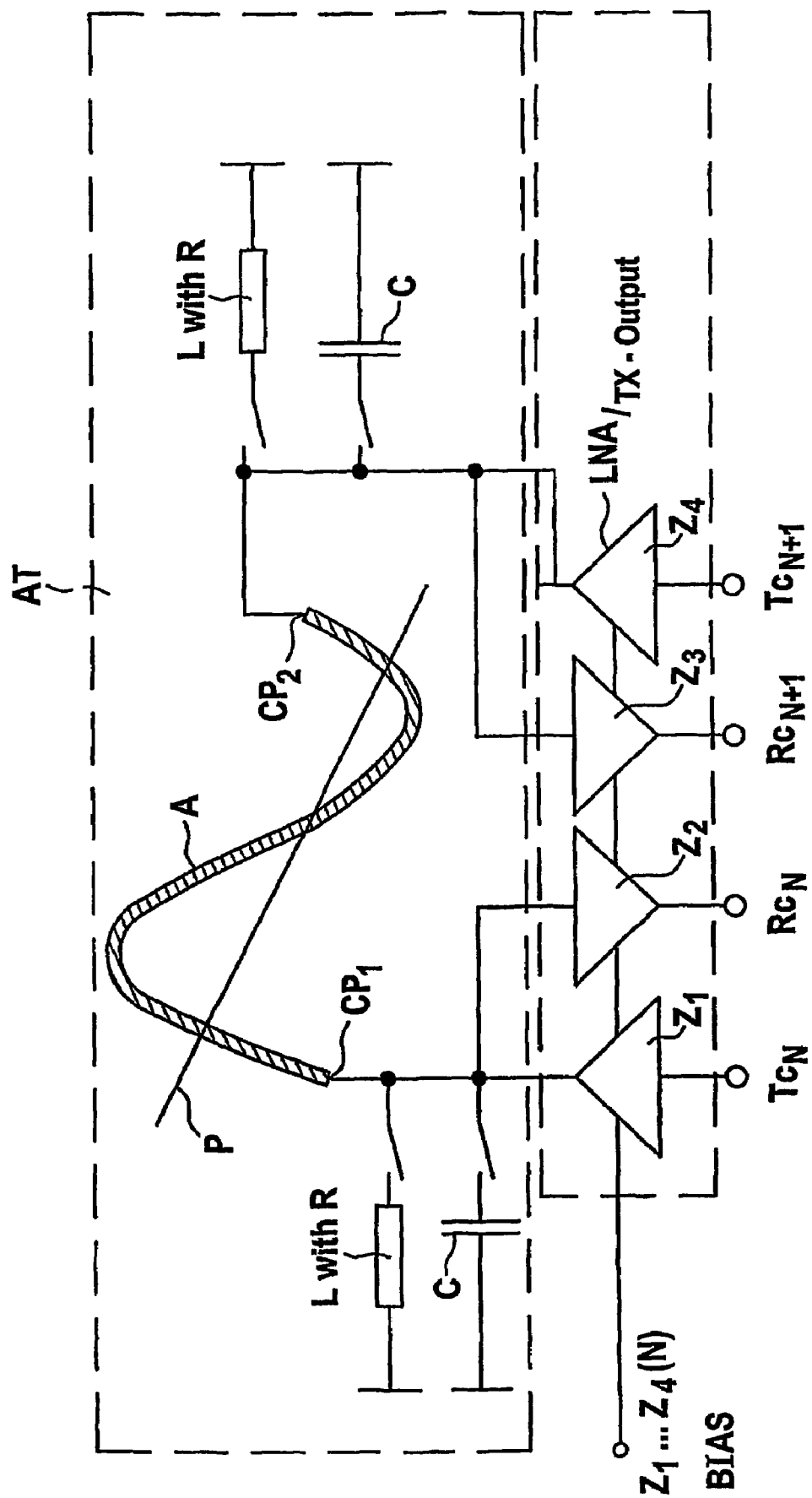
FIG. 4 is a wiring diagram illustrating a preferable implementation of an s-loop antenna into a terminal having a matching network integrated therein.

FIG. 4 shows another embodiment with an integrated patching network, which is formed as a low pass filter, consisting mainly of an LC unit. Each LC unit is connected to a connection point $CP_1$, $CP_2$ of the antenna A. Either of the connection points $CP_1$ or $CP_2$ may be switched as a transmission connector or as a reception connector. Such a choice depends on the switching status of either of the switches $Z_1 \ldots Z_4$. Each of the switches $Z_1 \ldots Z_4$ is adapted to set a respective channel, i.e. a transmission channel $Tc_n$, $Tc_{n+1}$, or a reception channel, i.e. channel $Rc_n$ or $Rc_{n+1}$, to the OFF or ON status. "N" may symbolize any number of antennas in an antenna terminal. In this particular embodiment, the patching network is integrated in the s-loop antenna A, which is indicated by the dashed line comprising the antenna A an the patch network. Further, the polarization direction is indicated by the line P in FIG. 4, i.e. the plane of polarization extends perpendicular to the plane of FIG. 4 and comprises the line P as a projection.

Figure 5:
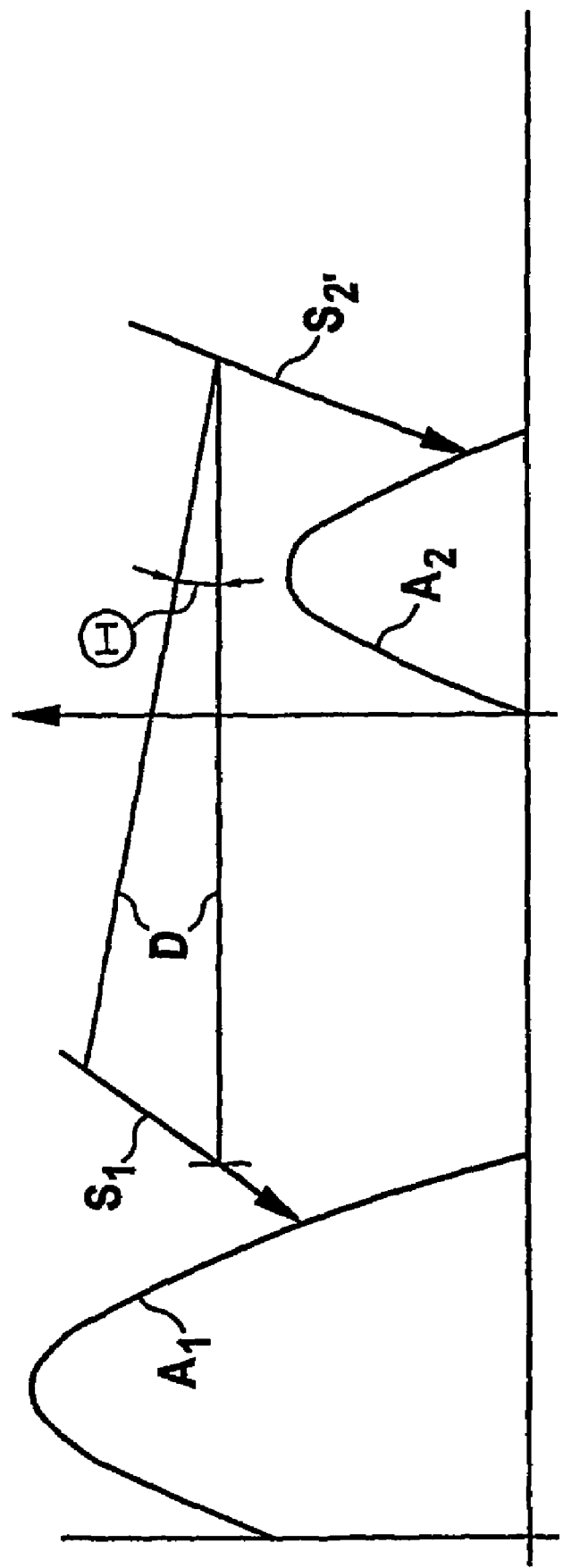
FIG. 5 shows an evolution of an antenna signal, when using two antennas in a preferred embodiment.

FIG. 5 indicates the time delay between a signal $S_1$ of an antenna $A_1$ and a signal $S_2$ of an antenna $A_2$ with regard to each other, when both signals radiate substantially in the same direction. The time delay is approximately linearly proportional to the distance D of both antennas and the angle θ between the radiation fronts, as indicated in FIG. 5. The time delay ΔT from antenna $A_1$ to antenna $A_2$ may be described by the formula:

$$\Delta T \sim (D/c \sin \theta), \text{ where c is the light velocity.}$$

A particularly preferred "intelligent" antenna configuration may be an s-loop wired copper antenna based on a flex strip with a matching unit on each end and a quadrature hybrid with a tri-state radio frequency functionality and an open loop part (tri-state part). Phase shifters with fixed parameters may be used to compensate the time delay ΔT between the radiation radiated by two such antennas $A_1$ and $A_2$.

Figure 6:
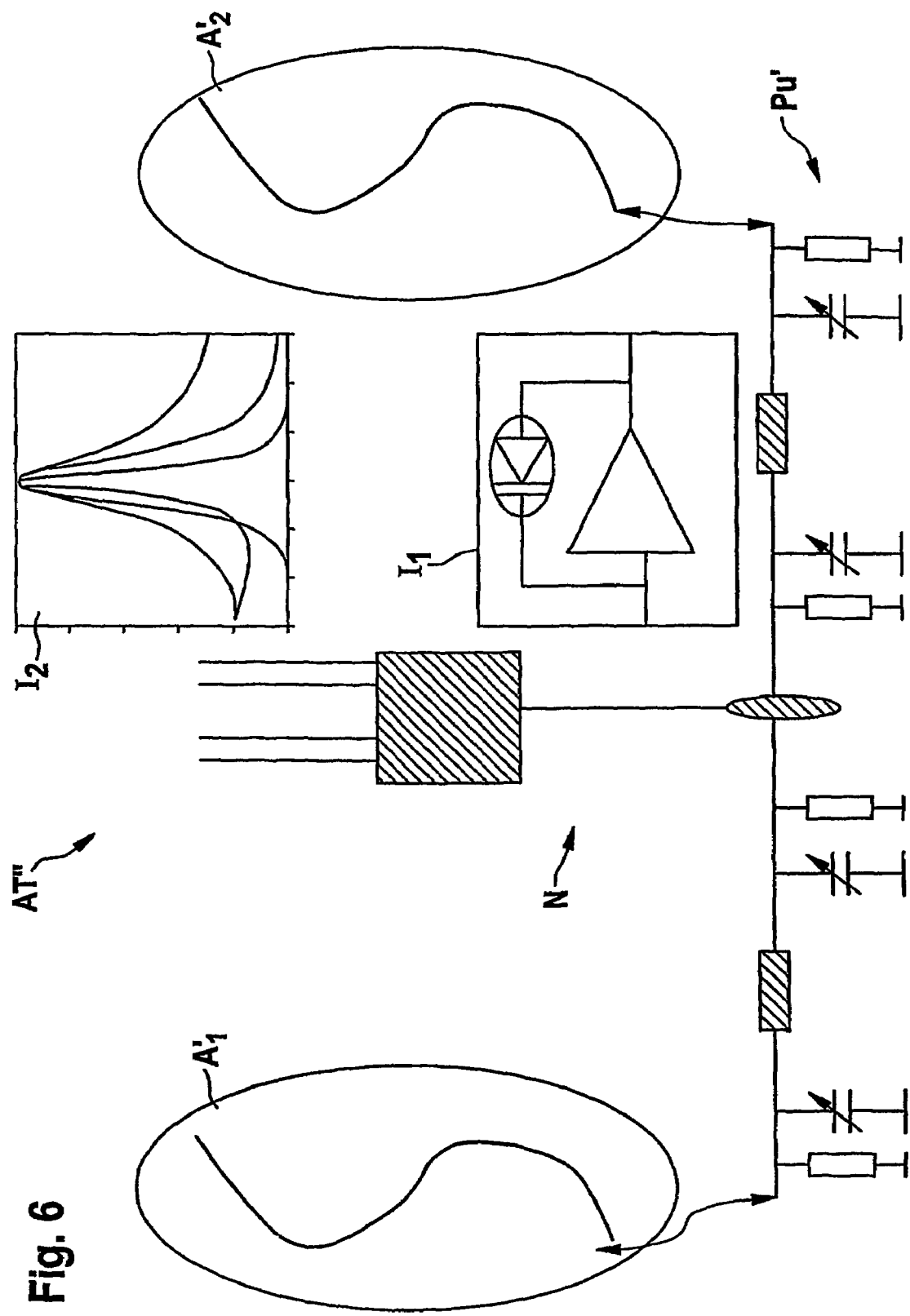
FIG. 6 is a schematic wiring diagram showing a further preferable implementation of two s-loop antennas into a terminal having a filter network, wherein the filter operates with a capacity coupled network for different frequencies.

In FIG. 6 a PI-filter network with only two antennas $A'_1$ and $A'_2$ is shown as another example of an antenna terminal AT" with a patching unit built as a low pass filter and a network connection N for further signal processing. In this particular example, the patching unit PU' is designed to use all integrated antennas for different frequencies and modes in parallel operation. The filter therefore operates particularly well with a capacity coupled network for different frequencies. The inset $I_1$ indicates the functional symbol for the patching unit PU'. In the additional inset $I_2$ filter curves are shown for various frequencies.

Figure 7:
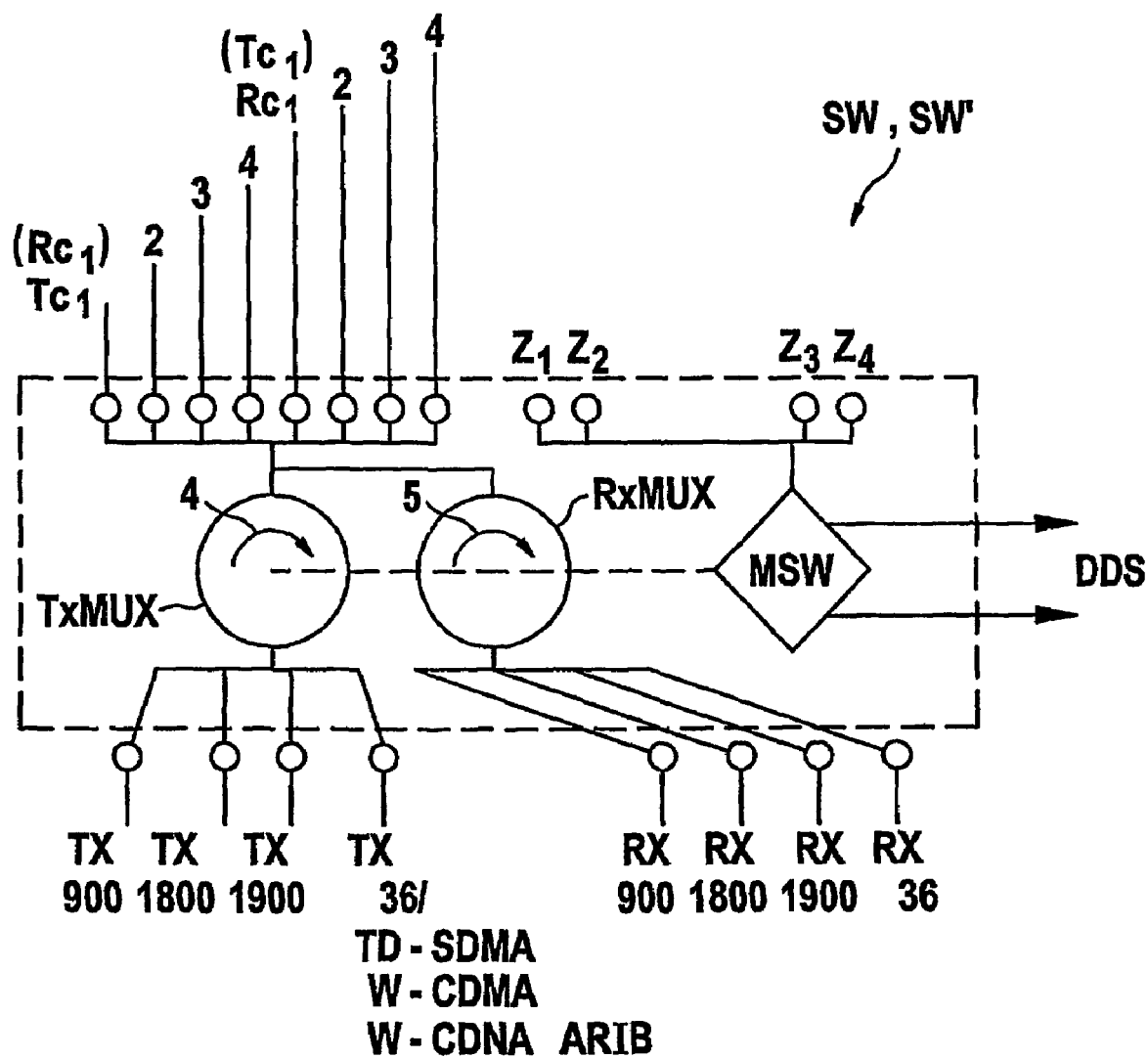
FIG. 7 is a wiring diagram illustrating a preferred embodiment of an antenna-switch in a preferred embodiment.

FIG. 7 illustrates the principle of the antenna-switch SW or SW' in the form of a wiring diagram. An antenna-switch SW or SW' is indicated by the dashed line in FIG. 7 and comprises a multi-switch MSW and a transmission-multiplexer TxMUX for multiplexing a transmissionpath Tx signal and a reception-multiplexer RxMUX for multiplexing a receptionpath Rx signal. The multiplexers TxMUX and RxMUX may be controlled by the signal generator DDS via the multi-switch MSW as indicated by arrows and the dashed line in FIG. 7. Each of the connectors $Tc_1 \ldots Tc_4$, $Rc_1 \ldots Rc_4$ are multi-switched by the multiplexers TxMUX and RxMUX respectively depending on the state of the multi-switch MSW, which in turn is used for switching the switches $Z_1 \ldots Z_4$. Depending on the situation, transmission multiplexing 4 and reception multiplexing 5 are accomplished by the TxMUX and RxMUX multiplexers respectively, which switch the connector channels of each of the antennas $A_1 \ldots A_4$ (as described with reference to FIG. 3). In such a way an operation in one of the states shown in the lower part of FIG. 7 is achieved. In particular, these applications comprise transmission Tx and reception Rx in a frequency band range of approximately 900 MHz, transmission and reception in a frequency band range of approximately 1800 MHz, transmission Tx and reception Rx in a frequency band range of 1900 MHz and transmission Tx and reception Rx in a combined 3G and TD-SDMA, ω-CDMA or ω-CDMA/ARIB operation.

The digital signal processor DDS preferably operates the multi-switch MSW by means of an "advisor"-algorithm, in particular, based on a combiner switch to operate the OFF-switches $Z_1 \ldots Z_4$. A particular method of operating the multiplexers TxMUX and RxMUX is to optimize an average square error for each of the available channels ($Tc_1 \ldots Tc_4$ and $Rc_1 \ldots Rc_4$). Switching is best performed, if the average square error is minimized for a specific channel switched by the multiplexer. A decision as to which available path should be switched by the multiplexer may be made by comparing the received values in a channel with regard to thresholds. In this particular case a threshold may be a noise threshold.

Figure 8:
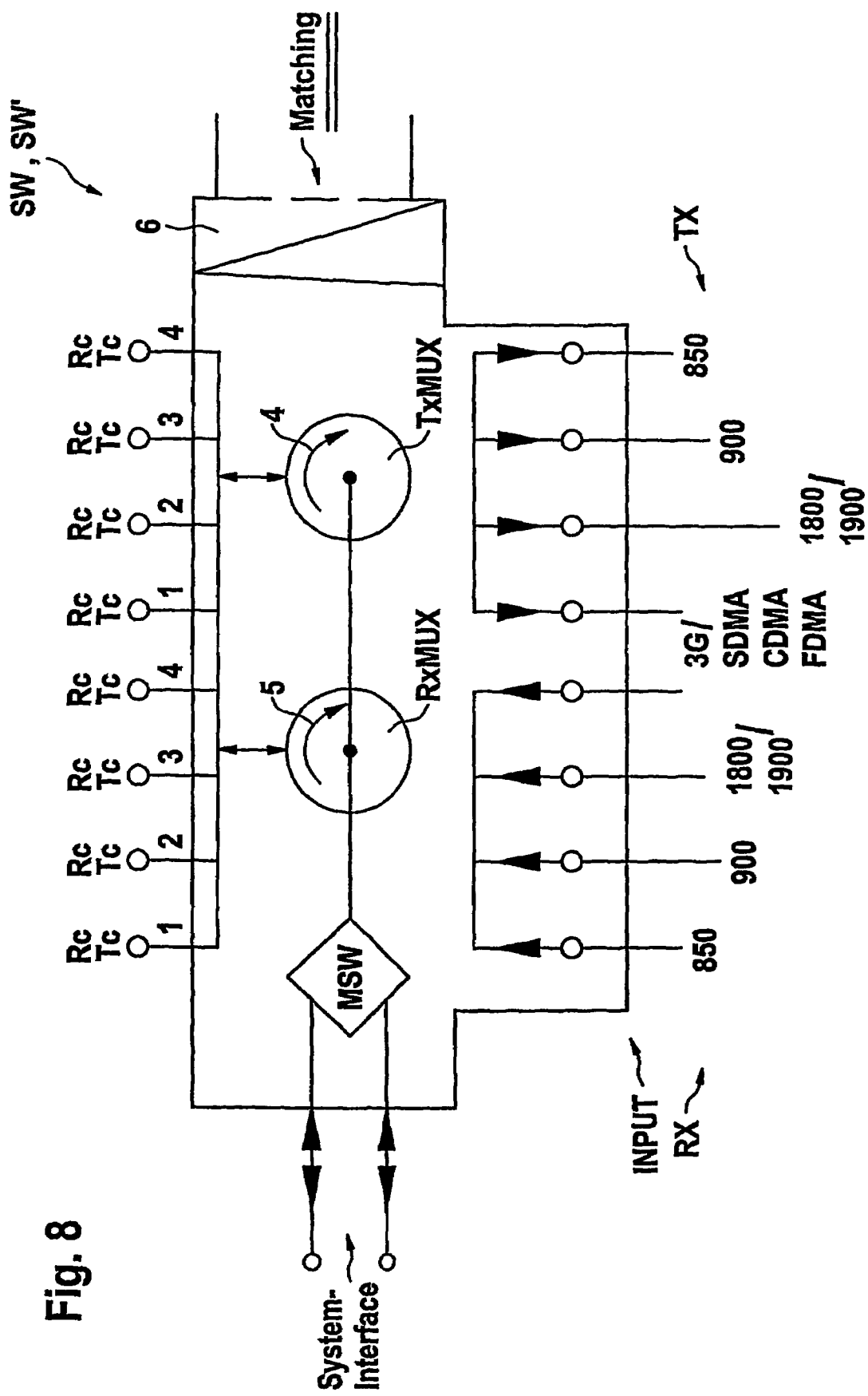
FIG. 8 is a wiring diagram illustrating another preferred embodiment of an antenna switch in another preferred embodiment.

FIG. 8 essentially shows the same switch as that shown and described in FIG. 7. The antenna-switch SW, SW' comprises a transmission-multiplexer TxMUX for multiplexing 4 four channels of different frequencies and possible combined applications and a reception-multiplexer RxMUX for multiplexing 5 four corresponding channels Tc, Rc 1 . . . 4 respectively. The multiplexers RxMUX and TxMUX are controlled by the DDS via a system interface and a multi-switch MSW. In addition to the components shown in FIG. 7, a matching unit 6 is provided for the antenna-switch SW, SW' in FIG. 8 to allow an optimal matching factor for the respective antennas and reception and transmission channels.

9 essentially shows an antenna-switch formed as a multi-switch driven combination of two multiplexers as already shown in FIGS. 7 and 8. The switching network is shown as an additional example to connect a transmission channel Tx via $Tc_1 \ldots Tc_4$ and a reception channel Rx via $Rc_1 \ldots Rc_4$. The bus connection to the digital signal processing DSP via the interface is also shown, as has already been indicated in FIG. 8. The arrows in the upper part of FIG. 9 indicate bus connections to a first end 1 . . . 4A of four s-loop antennas $A_1$ to $A_4$ of an antenna terminal, bus connections to another end 1 . . . 4E of four s-loop antennas $A_1$ to $A_4$ of an antenna terminal AT and bus connections to the switches $Z_1 \ldots Z_4$ of an antenna terminal AT, as shown in FIG. 3 for example.

Figure 9:
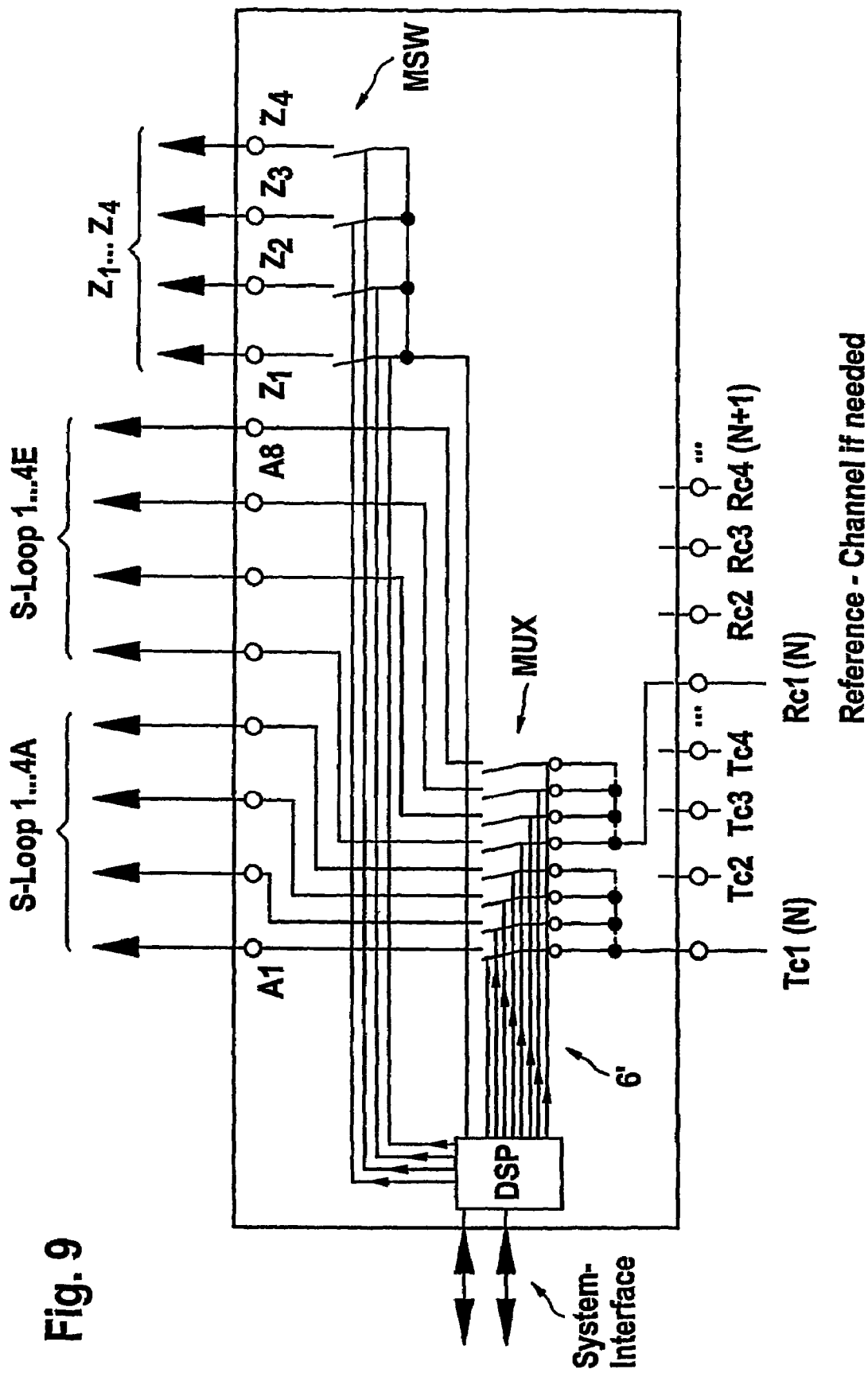
FIG. 9 is a wiring diagram illustrating a switching network in yet another preferred embodiment.

In FIG. 9, the multi-switch MSW and the multiplexer MUX are represented as a series of switches for switching transmission and reception channels $Tc_1 \ldots Tc_4$ and $Rc_1 \ldots Rc_4$ respectively. The dots in FIG. 9 with regard to the transmission and reception channels $Tc_i$ and $Rc_i$ respectively indicate that the number of channels/antennas is not restricted to four, but may be any suitable and advisable number, depending on the situation. For instance, two antennas could also be used as shown in FIG. 6 or even 3 antennas or more antennas like five, six, seven, eight antennas.

An antenna-switch may comprise a beam forming device such as a Butler-matrix.

Figure 10:
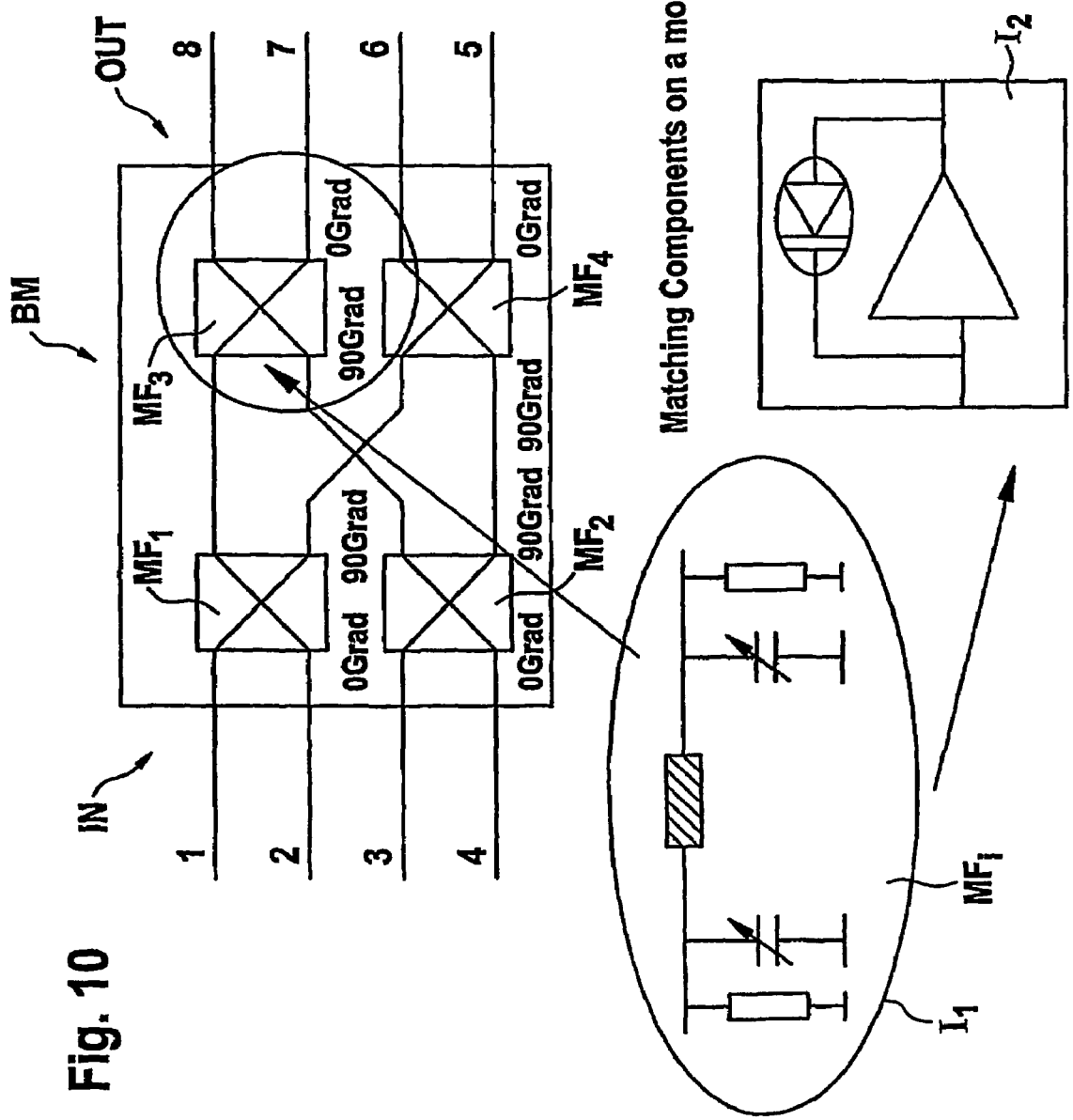
FIG. 10 is a schematic view of a 4×4 Butler-matrix having a modified output/input as a frequency regulated matching filter for an optimal matching factor of the beam antenna in a preferred embodiment.

FIG. 10 essentially shows the preferred embodiment of a Y×Y Butler-matrix exemplified by a 4×4 design. This particular Butler-matrix has a modified output OUT and input IN. Each output OUT and input IN comprises a frequency regulated matching filter for the provision of an optimal matching beam antenna factor. Each of the matching filters $MF_1$, $MF_2$, $MF_3$, $MF_4$ of the Butler-matrix BM is formed by an LC unit with a controllable capacity. A matching unit's wiring diagram Mfi is shown in the inset $I_1$ of FIG. 10 and the respective switching symbol in inset $I_2$ of FIG. 10.

Figure 11:
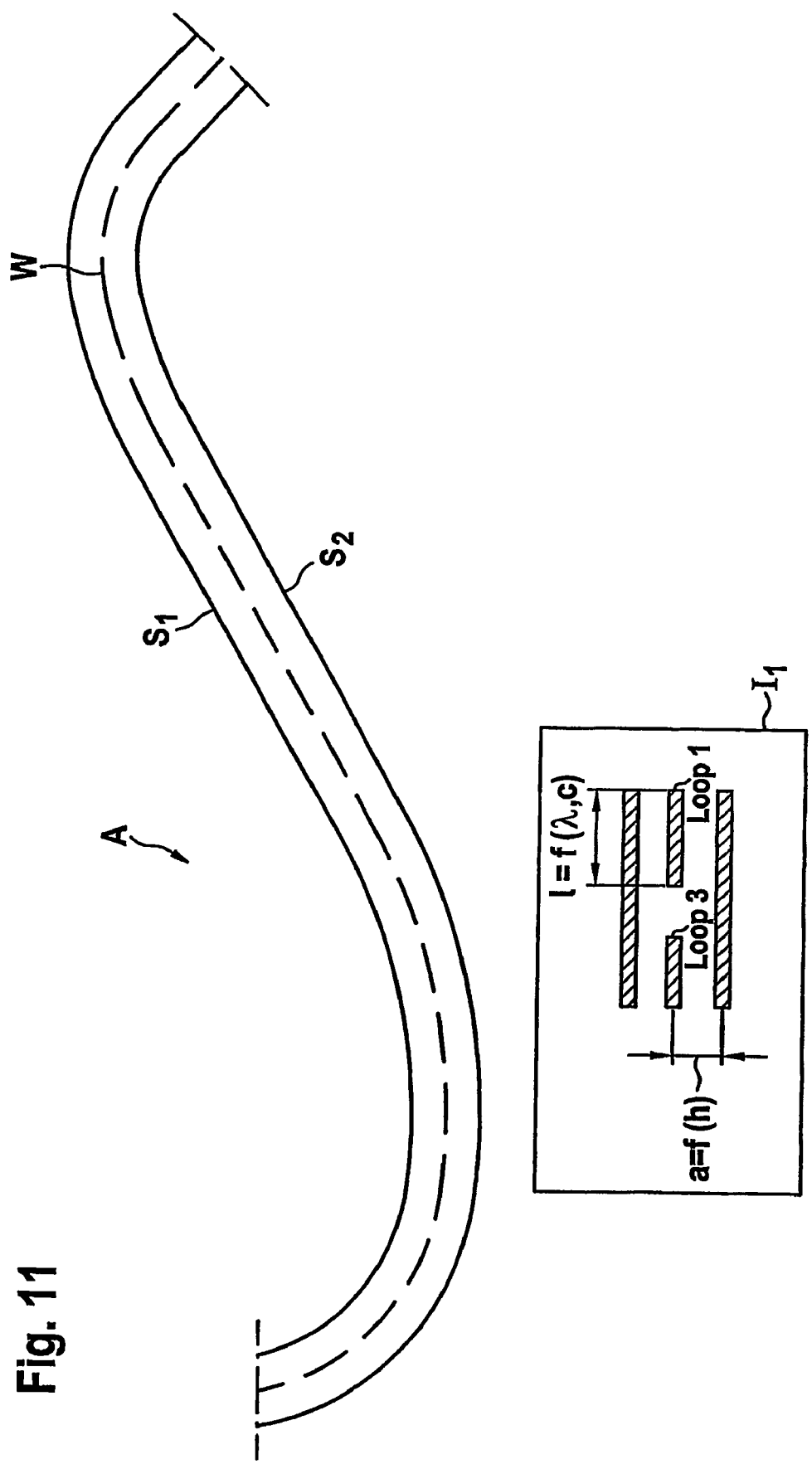
FIG. 11 is a schematic view illustrating a typical s-loop antenna design in a preferred embodiment.

FIG. 11 illustrates the typical configuration of an s-loop antenna with two reflecting side walls S1 and S2 to form a reflecting wave guide W therebetween. The inset $I_1$ of FIG. 11 indicates that the length "l" of an antenna is a function of the wavelength λ to be transmitted and/or received by the antenna A. Also the distance "a" between each of the reflecting side walls S1, S2 and the wave guide W is a function of the wave length "λ" transmitted/received by the antenna:

$$a = f(\lambda, c); \; l = f(\lambda, c)$$

Consequently, as indicated in the inset I1 of FIG. 11, the distance "a" and the length "l" are to be varied correspondingly for each of the antennas $A_1$ to $A_4$. In this example these are referred to as "Loop 1" and "Loop 3". Each of the antennas is thereby adapted to operate correctly within a specific frequency range.

Figure 12:
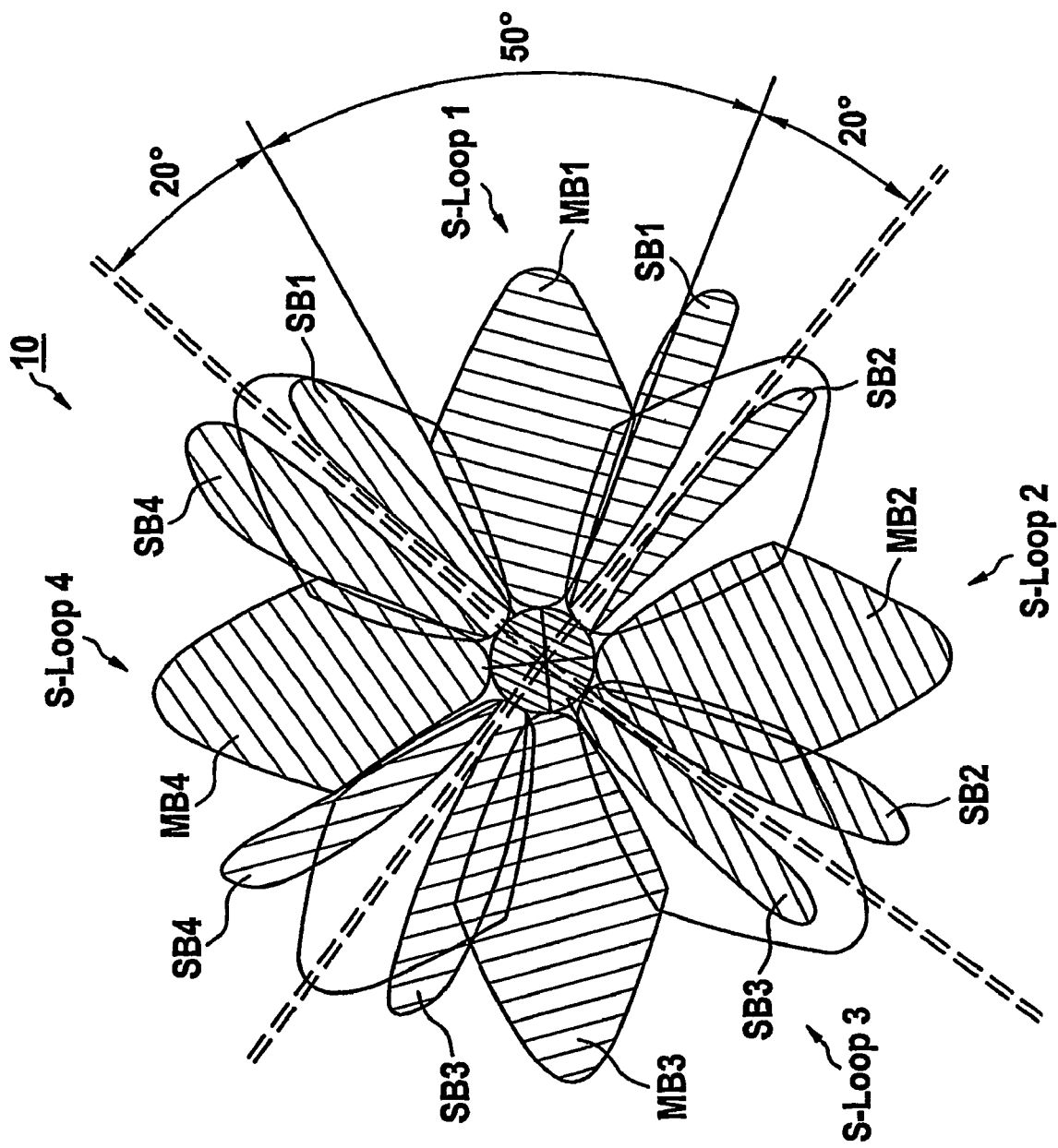
FIG. 12 is a schematic illustration of the beam formation of an antenna terminal comprising four antennas in a preferred embodiment.

By diagrammatically illustrating the beam width and an aperture size caused by such an antenna terminal, FIG. 12 indicates the radiation characteristics of an antenna terminal comprising four s-loop antennas, as shown in FIG. 3 for example. The antenna terminal has a 360 degree beam characteristic 10 with four quarter sectors, wherein each quarter sector is formed by a 90 degree section, the beam therein is formed by one of the terminal's s-Loop antennas. The sectors are referred to in the picture as "S-loop 1", "S-loop 2", "S-loop 3" and "S-loop 4". The 90 degree sections are indicated by double-dashed lines. Each 90 degree section comprises a 50 degree main beam MB1, MB2, MB3, MB4 of one loop as well as two 20 degree smaller side beams SB1, SB2, SB3, SB4, which are arranged on each side of the main beam and may be referred to as a parallel beam.

The four antennas are adapted to cover a spectrum of λ/8 to λ/16.

In summary, a transceiver is provided, which is adapted for use in most contemporary and future communication systems, and in which a direct digital synthesizer driven phase locked loop radio frequency signal generator is used to generate a modulated signal in a transmitter and a local oscillated signal in a receiver. Four switches are used in a particularly preferred embodiment to ensure that the common main part operates flexibly. In receive mode the direct digital synthesizer driven phase locked loop operates in the same way as a local oscillator, but with no modulating signal, thus, the phase locked loop has a narrow band filter in order to produce a better phase noise. The receiver demodulation operates in a zero intermediate frequency to directly convert a radio frequency signal to the base band in a preferred embodiment. In transmitter mode, the direct digital synthesizer is modulated and the phase locked loop operates in a valuable bandwidth in order to produce a better radio frequency modulated signal. The fact that the proposed transceiver comprises the direct digital synthesizer allows a fast switch speed to be achieved and allows the transceiver to be manufactured and developed at a lower cost than contemporary embodiments. This in turn means that a special antenna construction is needed for such multi-mode or combined systems, which may allow the specific design of a beam for a CDMA-FDMA/TDMA and FDMA/TDMA (2.5 G), and, of a combined 850 MHz to 1900 MHz antenna with propagation security for the user for GSM/PCM/DCS,. The transceiver is especially adapted for use in mobile phones. In particular, the proposed transceiver is formed in an advantageous antenna design with a multi-switch and connection path for switching the antennas of the antenna terminal. In particular a preferred Butler-matrix is provided in the antenna-switch with a modified input/output form as matching units. The antennas of the antenna terminal may also be matched with regard to the use of different frequencies or modes. The beam formation of the proposed transceiver antenna terminal is particularly adapted to allow advantageous cell detection options. The transceiver may be particularly used in 3G/GSM, PCS, PCN networks to combine different Rx and Tx paths, or in a mobile phone. The basic principle, however, could also be used in base stations and other suitable communication system devices. Particularly advantageous are both parallel multi-operation in different networks or systems and optional parallel transmitting and receiving, if necessary.

The invention claimed is:

1. Transceiver apparatus for use in a multi-frequency communication system, comprising:
    a signal processor;
    an antenna-switch comprising a multi-switch, a transmission-multiplexer and a reception multiplexer, wherein said multiplexers are controllable by the signal processor;
    a frequency conversion circuitry having a transmission path and a reception path, wherein each of the paths communicatively connects the signal processor and the antenna-switch; and
    an antenna terminal having a first antenna and at least a second antenna that are connected to respective switches, the first antenna having at a first end a first transmission-connector for connecting the first antenna to the transmission path and having at a second end a first reception-connector for connecting the first antenna to the reception path, the at least second antenna having at a first end a second transmission-connector for connecting the at least second antenna to the transmission path and having at a second end a second reception-connector for connecting the at least second antenna to the reception path, wherein the antenna-switch, controllable by the signal processor, allows multi-frequency operation of the antenna terminal by combining a transmission-mode and a reception-mode of each of the antennas,
    the signal processor controlling the respective switches of the antennas such that, at a particular instant in time, each of the antennas is configured as either a transmit-only antenna or a receive-only antenna.

2. The transceiver apparatus of claim 1, wherein the signal processor is an analogue-digital signal processor formed by a direct digital synthesizer driven phase locked loop radio frequency signal generator.

3. The transceiver apparatus of claim 1, wherein the frequency conversion circuitry comprises at least one of a local oscillator and a power divider to supply a local oscillator power to the transmission path or the reception path or both the transmission path and the reception path.

4. The transceiver apparatus of claim 1, wherein the frequency conversion circuitry comprises a mixer device for converting the signal between an intermediate frequency and a radio frequency.

5. The transceiver apparatus of claim 1, wherein the frequency conversion circuitry comprises a direct conversion device for converting the signal between a base band frequency and a radio frequency, in particular by means of an IQ-method.

6. The transceiver apparatus of claim 1, wherein the antenna switch comprises a matching unit formed as a frequency regulated matching filter in order to provide an optimal matching factor for at least one of the antennas.

7. The transceiver apparatus of claim 1, wherein the antenna switch comprises a bus connection to the signal processor, wherein the bus-connection is formed as a matching network.

8. The transceiver apparatus of claim 1, wherein the antenna switch further comprises a beam forming matrix device, in particular a Butler-output-matrix selected from the group consisting of: a 4×4, an 8×8 and a 16×16 Butler output matrix.

9. The transceiver apparatus of claim 8, wherein matching units are provided inside the Butler-output-matrix, in particular a modified Butler-output matrix output/input is formed as a frequency regulated matching filter in order to provide an optimal matching factor for at least one of the antennas.

10. The transceiver apparatus of claim 1, wherein the antenna terminal comprises a patching unit formed as a low-pass-filter to improve the matching of the antenna for different frequencies and/or for different modes of a multi-frequency communication system, in particular of a mobile cellular communication system or a personal communication system.

11. The transceiver apparatus of claim 1, wherein the antenna terminal comprises a matching unit for at least one of the antennas, in particular an LC component, in order to provide an optimal matching factor at least one of the antennas.

12. The transceiver apparatus of claim 1, wherein at least one of the antennas is formed as an s-loop antenna having two ends formed as the transmission connector and/or the reception connector.

13. The transceiver apparatus of claim 1, wherein at least one of the antennas is configured as a copper wired antenna, in particular as a flexible line antenna made of copper.

14. The transceiver apparatus of claim 1, wherein at least one of the antennas is configured as a SMD-planar antenna.

15. The transceiver apparatus of claim 1, wherein at least one of the antennas has a body and the body comprises an integrated patching and/or matching unit.

16. The transceiver apparatus of claim 1, wherein the antenna beam is formed within a range of 200 degrees.

17. The transceiver apparatus of claim 1, wherein the antenna beam comprises a 90 degree beam, in particular the beam is formed by a 50 degree main beam and two 20 degree side beams.

18. A method of transceiving a multi-frequency signal in a multi-frequency communication system, comprising the steps of:
processing the signal in a signal processor;
operating an antenna terminal by an antenna-switch comprising a multi-switch, a transmission multiplexer and a reception multiplexer, wherein the multiplexers are controlled by the signal processor, and transceiving the signal by means of at least a selected one of a plurality of antennas of the antenna terminal, antenna terminal having a first antenna and at least a second antenna that are connected to respective switches, the first antenna having at a first end a first transmission-connector for connecting the first antenna to the transmission path and having at a second end a first reception-connector for connecting the first antenna to the reception path, the at least second antenna having at a first end a second transmission-connector for connecting the at least second antenna to the transmission path and having at a second end a second reception-connector for connecting the at least second antenna to the reception path; and
frequency converting the signal in a frequency conversion circuitry wherein frequency converting of the signal in the frequency conversion circuitry is established on a transmission path and a reception path, wherein each of the paths communicates the signal between the signal processor and the antenna switch,
wherein multi-frequency antenna terminal operation is established by combining a transmission-mode of the antenna and a reception-mode of the antenna, controlled by the signal processor, by means of the antenna-switch, and communicating the signal between the transmission path and the selected antenna via the transmission multiplexer and a transmission connector of the antenna and between the reception path and the selected antenna via the reception multiplexer and a reception connector of the selected antenna,
the signal processor controlling the respective switches of the antennas such that, at a particular instant in time, each of the antennas is configured as either a transmit-only antenna or a receive-only antenna.

19. The method of claim 18, comprising frequency converting the signal in a frequency conversion circuitry between a base band signal and a radio frequency signal.

20. The method of claim 18, comprising frequency converting the signal in a frequency conversion circuitry between an intermediate frequency signal and a radio frequency signal.

21. The method of claim 18, wherein a reference of an incoming signal is processed in an antenna switch after checking a beam direction and a signal quality, in particular based on a BER-measurement.

22. A communications transceiver comprising:
an antenna terminal having a first antenna and at least a second antenna that are connected to respective switches, the first antenna having at a first end a first transmission-connector for connecting the first antenna to the transmission path and having at a second end a first reception-connector for connecting the first antenna to the reception path, the at least second antenna having at a first end a second transmission-connector for connecting the at least second antenna to the transmission path and having at a second end a second reception-connector for connecting the at least second antenna to the reception path;
a transmission path;
a reception path;
a transmission multiplexer coupled to the transmission path and to the first and at least a second antennas;
a reception multiplexer coupled to the reception path and to the multiple antennas; and
a processor;
wherein the processor controls the transmission multiplexer and the reception multiplexer such that during transmission the transmission path is coupled to a selected antenna of the first and at least a second antennas and during reception the reception path is coupled to a selected antenna of the first and at least a second antennas; and
wherein the processor controls the respective switches of the first and at least a second antennas such that, at a particular instant in time, each of the first and at least a second antennas is configured as either a transmit-only antenna or a receive-only antenna.

23. The communications transceiver of claim 22, wherein each respective switch of the first and at least a second antenna comprises a bus connection to the processor, wherein the bus connection is formed as a matching network.

24. The communications transceiver of claim 22, wherein each of the respective switches of the first and at least a second antenna comprise a beam forming matrix device of the Butler-output-matrix type selected from the group comprising a 4×4, an 8×8 and a 16×16 Butler output matrix.

* * * * *